United States Patent [19]
Smith et al.

[11] Patent Number: 6,035,942
[45] Date of Patent: Mar. 14, 2000

[54] FULL TRUSS TOOL BAR

[75] Inventors: Casey P. Smith; Stephen L. Wahls, both of Holdrege, Nebr.

[73] Assignee: Hawkins Mfg., Inc., Holdrege, Nebr.

[21] Appl. No.: 09/145,511

[22] Filed: Sep. 2, 1998

Related U.S. Application Data

[60] Provisional application No. 60/058,714, Sep. 12, 1997.

[51] Int. Cl.⁷ .................................................. A01B 49/00
[52] U.S. Cl. ............................ 172/311; 172/456; 111/57; 111/66; 111/63; 111/59
[58] Field of Search .................................... 172/311, 456, 172/310, 312, 457, 459, 452, 471, 776; 111/59, 52, 53, 54, 55, 57, 63, 66

[56] References Cited

U.S. PATENT DOCUMENTS

| | | | |
|---|---|---|---|
| 4,126,189 | 11/1978 | Channel | 172/456 |
| 4,204,575 | 5/1980 | Richardson et al. | 172/311 X |
| 4,206,815 | 6/1980 | Hatcher | 172/311 |
| 4,529,040 | 7/1985 | Grollimund | 172/311 |
| 5,429,195 | 7/1995 | Turnis | 172/311 |
| 5,577,563 | 11/1996 | Holen | 172/456 |
| 5,740,870 | 4/1998 | Rodgers et al. | 172/456 |
| 5,921,325 | 7/1999 | Meek et al. | 172/311 |

*Primary Examiner*—Victor Batson
*Attorney, Agent, or Firm*—Zarley, McKee, Thomte Voorhees & Sease; Dennis L. Thomte

[57] ABSTRACT

A full truss tool bar is disclosed comprising an elongated main tool bar section having right and left tool bar wing sections positioned at the right and left ends of the main tool bar section. An elongated main truss member is positioned above the main tool bar section and is secured thereto. Right and left truss members are positioned above the right and left tool bar wing sections and are secured thereto. The main truss member is pivotally connected to the right and left truss members, about horizontal axes. In a modified version of the device, auxiliary tool bar sections are positioned outwardly of the right and left tool bar wing sections and have truss sections positioned thereabove and secured thereto. The trusses on the auxiliary tool bar sections are pivotally connected, about vertical axes, to the outer ends of the right and left tool bar wing sections.

3 Claims, 5 Drawing Sheets

FULL TRUSS TOOL BAR

CROSS-REFERENCE TO RELATED APPLICATION

Applicants filed a provisional application entitled FULL TRUSS TOOL BAR which was accorded Ser. No. 60/058,714 and a filing date of Sep. 12, 1997.

BACKGROUND OF THE INVENTION

1. Field of the Invention

The present invention relates generally to tool bars having hinged wings at the ends thereof, and more particularly to an improved tool bar having a full truss extending beyond the length of the main tool bar and onto the hinged wings.

2. Description of the Related Art

FIG. 1 illustrates a prior art tool bar having a main tool bar member and a pair of wings hinged to the main tool bar member. A truss is mounted along a portion of the length of the main tool bar section to strengthen the tool bar. While this type of truss is useful for supporting the center of the tool bar, it provides no strength for the ends of the main tool bar member or the wings. In addition, it can be seen that the hinge mechanisms, and the accompanying cylinders of the prior art, utilize a large amount of space along the tool bar, making it impossible to use the tool bar for many different jobs. space along the tool bar, making it impossible to use the tool bar for many different jobs.

SUMMARY OF THE INVENTION

A full truss tool bar is disclosed comprising an elongated main tool bar section having right and left ends. An elongated right tool bar wing section, having inner and outer ends, is positioned at the right end of the main tool bar section. An elongated left tool bar wing section, having inner and outer ends, is positioned at the left end of the main tool bar section. An elongated main truss member, having right and left ends, is positioned above the main tool bar section and is secured thereto. The main truss member has its right end positioned adjacent the right end of the main tool bar section and has its left end positioned adjacent the left end of the main tool bar section. An elongated right truss member, having inner and outer ends, is positioned above the right tool bar wing section and is secured thereto. An elongated left truss member, having inner and outer ends, is positioned above the left tool bar wing section and is secured thereto. A first lift cylinder is pivoted at its base end, about a horizontal axis, to the right end of the main truss member and has its rod end pivoted, about a horizontal axis, to the inner end of the right truss member. A second lift cylinder is pivoted at its base end, about a horizontal axis, to the left end of the main truss member and has its rod end pivoted, about a horizontal axis, to the inner end of the left truss member.

In a modified form of the invention, a right auxiliary tool bar section is positioned at the outer end of the right tool bar wing section and a left auxiliary tool bar section is positioned at the outer end of the left tool bar wing section. A right auxiliary truss member is positioned above the right auxiliary tool bar section and is secured thereto. A left auxiliary truss member is positioned above the left auxiliary tool bar section and is secured thereto. A hydraulic cylinder is pivotally connected to the outer end of the right truss member and to the right auxiliary truss section. A hydraulic cylinder is connected to the outer end of the left truss member and to the left auxiliary truss member. The auxiliary tool bar sections are pivoted inwardly with respect to the right and left tool bar wing sections and the right and left tool bar sections are pivoted upwardly with respect to the main tool bar section.

It is therefore a principal object of the invention to provide an improved tool bar for use in agricultural endeavors.

Still another object of the invention is to provide a full truss tool bar.

Still another object of the invention is to provide a tool bar comprising a main tool bar section, right and left tool bar wing sections, and right and left auxiliary tool bar sections, with each of the tool bar sections having truss members positioned thereabove and secured thereto to provide the required strength to the assembly.

Still another object of the invention is to provide a full truss tool bar which has the ability to accommodate most attachments.

These and other objects will be apparent to those skilled in the art.

DESCRIPTION OF THE PREFERRED EMBODIMENT

Figure 1:
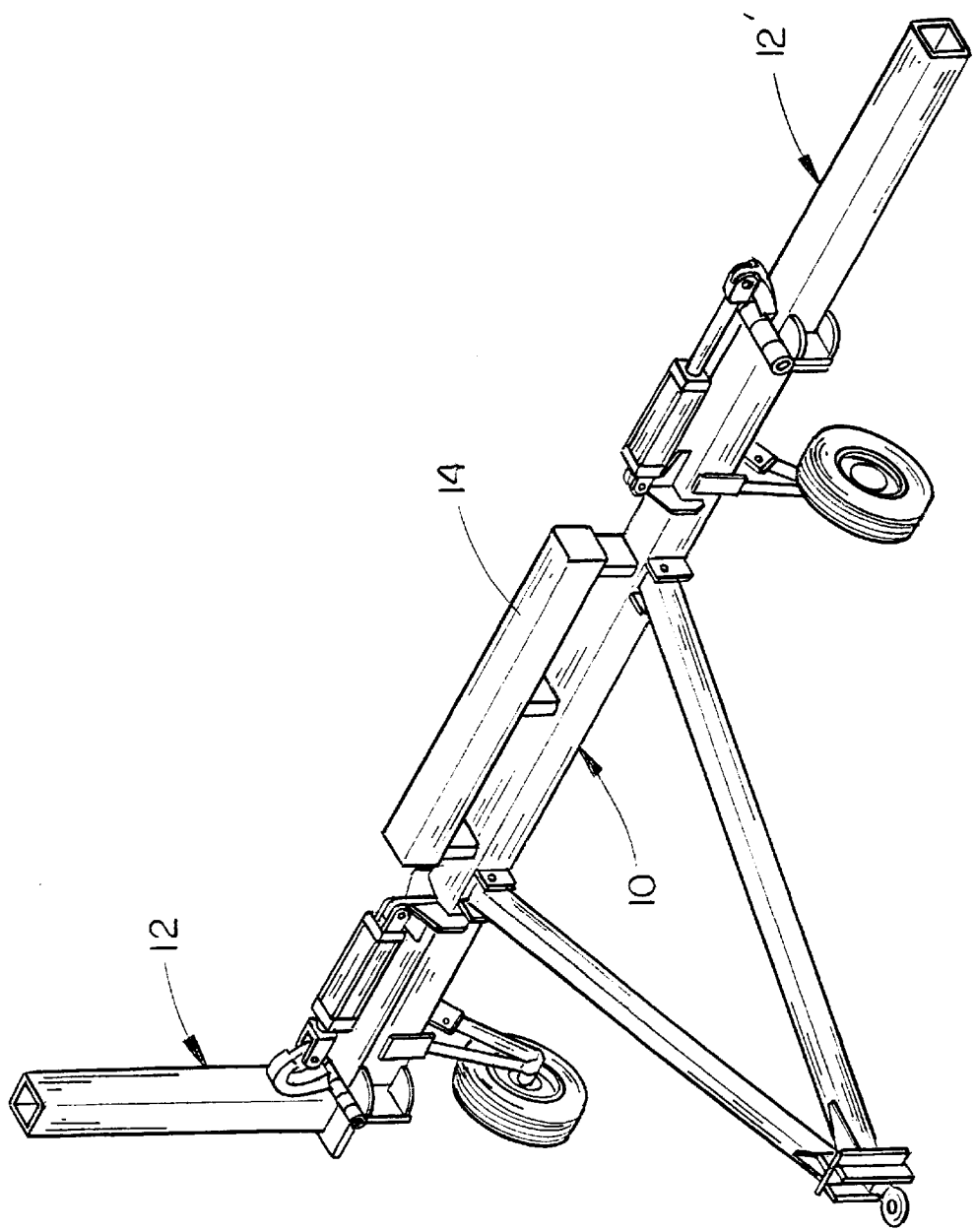
FIG. 1 is a front perspective view of a prior art tool bar.

Referring now to the drawings, FIG. 1 illustrates a prior art tool bar having a main tool bar section 10 and a pair of wings 12 and 12' hinged to the main tool bar section 10. A truss 14 is mounted along a portion of the length of the main tool bar section 10 to strengthen the tool bar. While this type of truss 14 is useful for supporting the center of the tool bar, it provides no strength for the ends of the main tool bar section 10 or the wings 12 and 12'. In addition, it can be seen that the hinge mechanisms and their accompanying cylinders, utilize a large amount of space along the tool bar, making it impossible to use the tool bar for many different jobs.

Figure 2:
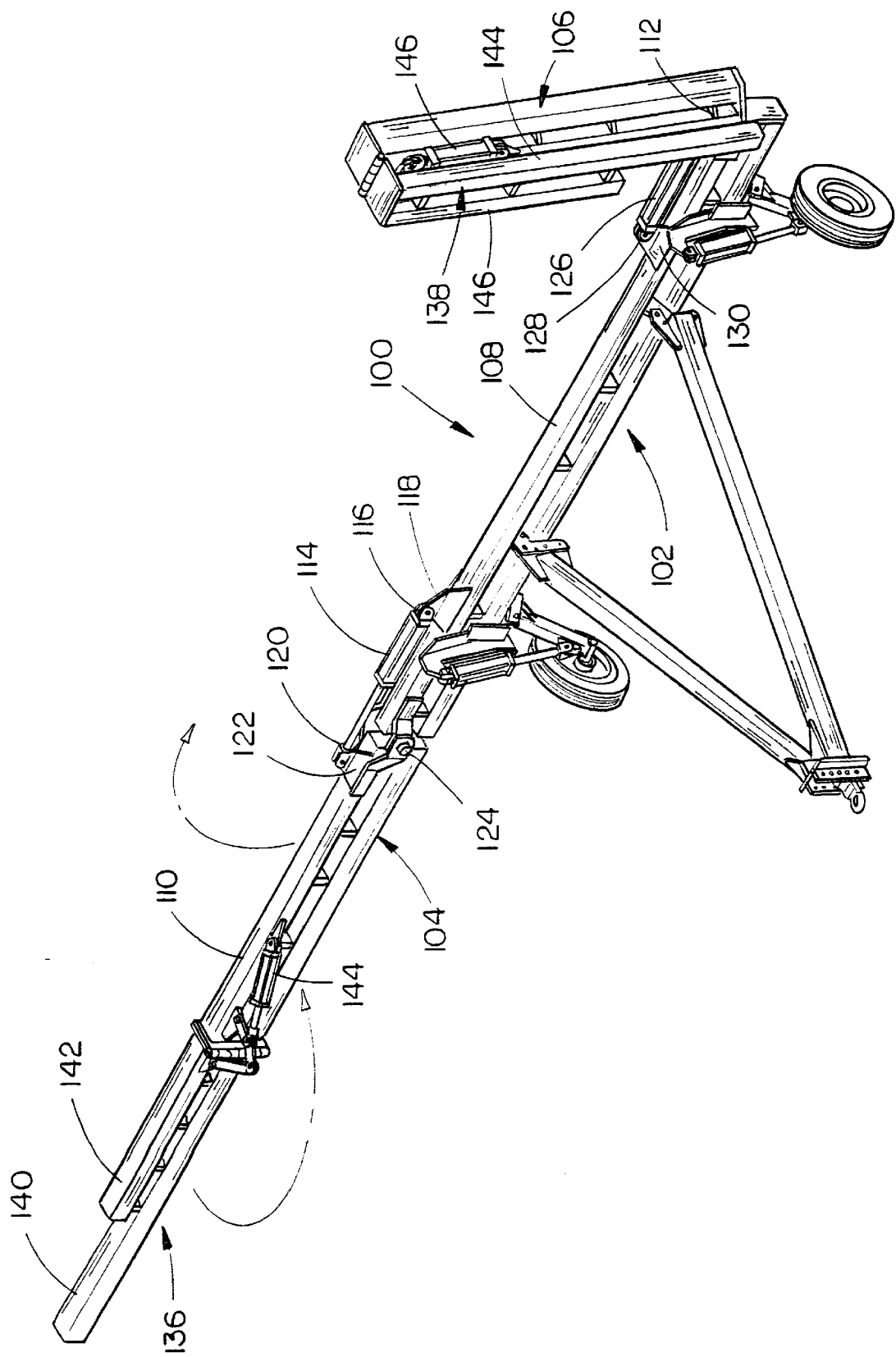
FIG. 2 is a front perspective view of the full truss tool bar of this invention having optional auxiliary tool bar sections pivotally secured to the outer ends of the tool bar wing sections.

FIG. 2 illustrates the full truss tool bar of the present invention, generally designated at 100. FIG. 2 illustrates the use of optional auxiliary tool bar sections positioned outwardly of the right and left tool bar sections, as will be described hereinafter. The full truss tool bar 100 includes a main tool bar section 102, and tool bar wing sections 104 and 106 pivotally connected to the opposite ends of the main tool bar section 102. Truss 108 extends along the entire length of the main tool bar section 102. Tool bar wing sections 104 and 106 are provided with truss sections 110 and 112 provided thereon which add strength to the tool bar wing sections 104 and 106, respectively. A first lift cylinder 114 has its base end 116 pivotally secured to a bracket 118 which is secured to truss 108 and has its rod end 120 pivotally secured to a bracket 122 which is secured to truss 110. As seen in the drawings, trusses 108 and 110 are pivotally connected together by means of shaft or pin 124.

Hydraulic cylinder 126 is pivotally connected at its base end 128 to bracket 130 which is secured to truss 108 and which has its rod end 132 pivotally connected to bracket 134 which is secured to truss 112.

The full truss tool bar illustrated in FIG. 2 is much stronger than the conventional tool bars due to the fact that the tool bar wing sections 104 and 106 have trusses associated therewith. Further, the fact that the lift cylinders 114 and 126 are secured to the trusses rather than to the tool bar sections themselves enables attachments to be attached to the tool bars without the cylinders occupying needed space. Although it is preferred that the trusses 110 and 112 extend the full length of the wing sections 104 and 106, respectively, the trusses 110 and 112 may only extend for a portion of the length thereof. However, when auxiliary tool bar sections are utilized, as will be described hereinafter, the trusses 110 and 112 should extend the entire length of wing sections 104 and 106, respectively.

Figure 3:
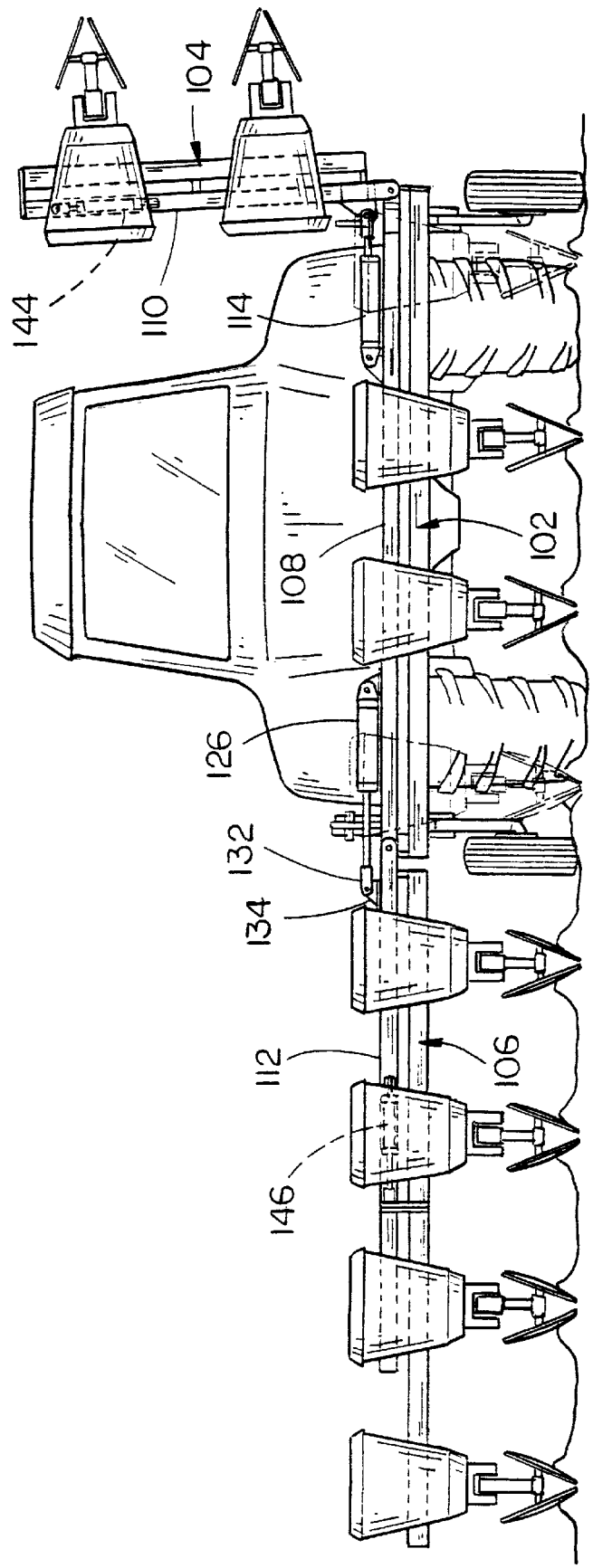
FIG. 3 is a rear view of the tool bar of FIG. 2 having planter units mounted thereon.
Figure 4:
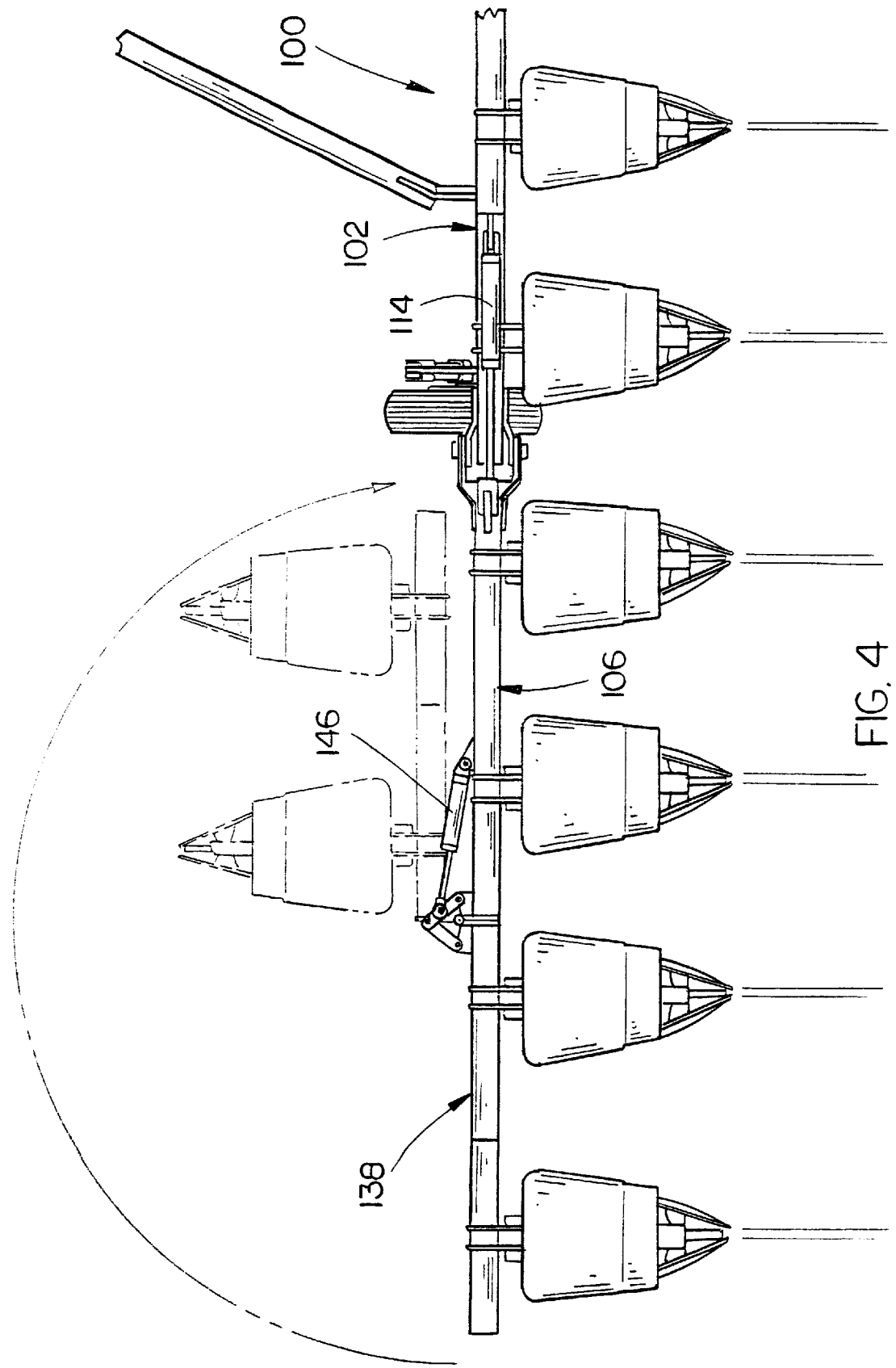
FIG. 4 is a top view of the tool bar of FIG. 3 with the broken lines illustrating the left auxiliary tool bar section pivoted to its folded position.
Figure 5:
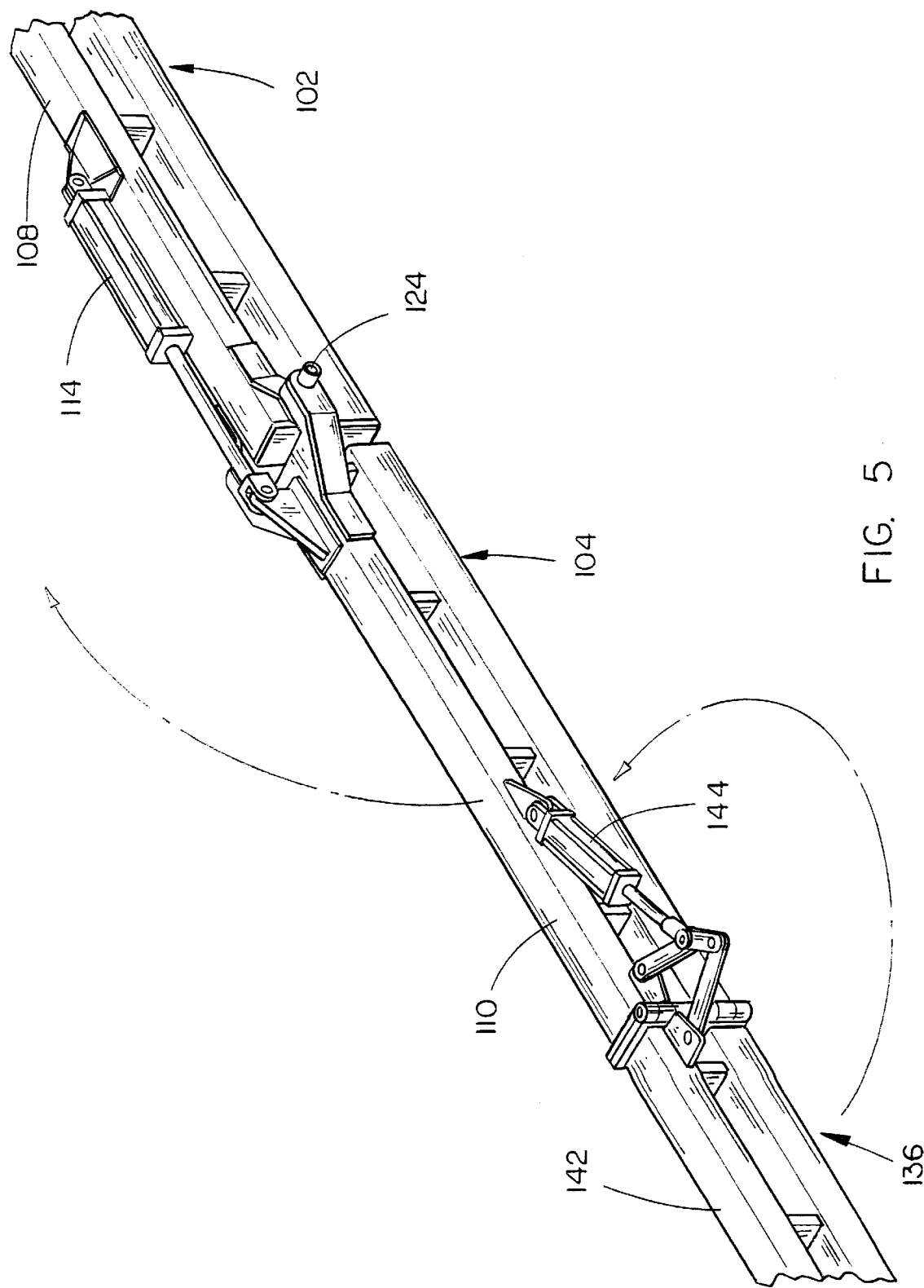
FIG. 5 is a partial front perspective view of the tool bar of this invention.

The fact that the trusses 110 and 112 may extend the full length of the tool bar wing sections 104 and 106, respectively, enables auxiliary wing sections 136 and 138 to be hinged to the outer ends of the wing sections 104 and 106, respectively. Auxiliary wing section 136 includes an auxiliary tool bar section 140 having a truss 142 positioned thereabove and secured thereto. Similarly, auxiliary wing section 138 includes an auxiliary tool bar section 144 having a truss 146 positioned thereabove and secured thereto. The outer ends of the tool bar section 104 and the truss 110 are pivotally secured to the inner ends of the auxiliary tool bar 136 and the truss 142 about a vertical axis, as illustrated in the drawings. Hydraulic cylinder 144 is operatively connected to the hinge to enable the auxiliary tool bar section 136 to be folded inwardly with respect to the tool bar wing section 104, as illustrated in the drawings. Similarly, the hydraulic cylinder 146 is provided to enable the auxiliary tool bar section 138 to be folded inwardly adjacent the tool bar wing section 106, as also illustrated in the drawings. Inasmuch as truss 108 extends along the entire length of the main tool bar section 102, and effectively extends onto a portion of the wings 104 and 106, the hinge mechanisms are able to be moved from the tool bar itself to the associated truss, which permits implements, such as planter units, to be attached to any location along the entire main tool bar section 102 and the tool bar sections 104 and 106. Practical implementation of the invention is shown in FIGS. 3 and 4, wherein the tool bar is mounted on a pair of wheel sets and connected via tongue members to a towing hitch.

Thus it can be seen that the invention accomplishes at least all of its stated objectives.

We claim:

1. A full truss tool bar, comprising:

an elongated main tool bar section having right and left ends;

an elongated right tool bar wing section, having inner and outer ends, positioned at said right end of said main tool bar section, the entire length of said right tool bar section being movable with respect to said main tool bar section;

an elongated left tool bar wing section, having inner and outer ends, positioned at said left end of said main tool bar section, the entire length of said left tool bar section being movable with respect to said main tool bar section;

an elongated main truss member, having right and left ends, positioned above said main tool bar section and being secured thereto;

said main truss member having its right end positioned adjacent said right end of said main tool bar section;

said main truss member having its left end positioned adjacent said left end of said main tool bar section;

an elongated right truss member, having inner and outer ends, positioned above said right tool bar wing section and being secured thereto for movement therewith;

an elongated left truss member, having inner and outer ends, positioned above said left tool bar wing section and being secured thereto for movement therewith;

a first lift cylinder, having a base end and a rod end, pivoted at its said base end, about a horizontal axis, to said right end of said main truss member and having its said rod end pivoted, about a horizontal axis, to said inner end of said right truss member;

and a second lift cylinder, having a base end and a rod end, pivoted at its said base end, about a horizontal axis, to said left end of said main truss member and having its said rod end pivoted, about a horizontal axis, to said inner end of said left truss member.

2. A full truss tool bar, comprising:

an elongated main tool bar section having right and left ends;

an elongated right tool bar wing section, having inner and outer ends, positioned at said right end of said main tool bar section;

an elongated left tool bar wing section, having inner and outer ends, positioned at said left end of said main tool bar section;

an elongated main truss member, having right and left ends, positioned above said main tool bar section and being secured thereto;

said main truss member having its right end positioned adjacent said right end of said main tool bar section;

said main truss member having its left end positioned adjacent said left end of said main tool bar section;

an elongated right truss member, having inner and outer ends, positioned above said right tool bar wing section and being secured thereto;

an elongated left truss member, having inner and outer ends, positioned above said left tool bar wing section and being secured thereto;

a first lift cylinder, having a base end and a rod end, pivoted at its said base end, about a horizontal axis, to said right end of said main truss member and having its said rod end pivoted, about a horizontal axis, to said inner end of said right truss member;

a second lift cylinder, having a base end and a rod end, pivoted at its said base end, about a horizontal axis, to said left end of said main truss member and having its said rod end pivoted, about a horizontal axis, to said inner end of said left truss member;

a right auxiliary tool bar section, having inner and outer ends, positioned at said outer end of said right tool bar wing section;

a left auxiliary tool bar section, having inner and outer ends, positioned at said outer end of said left tool bar wing section;

said right auxiliary tool bar section having a right auxiliary truss member, having inner and outer ends, positioned thereabove and secured thereto;

said left auxiliary tool bar section having a left auxiliary truss member, having inner and outer ends, positioned thereabove and secured thereto;

said outer ends of said right tool bar wing section and said right truss member being pivotally secured, about a vertical axis, to said inner ends of said right auxiliary tool bar section and said right auxiliary truss member;

said outer ends of said left tool bar wing section and said left truss member being pivotally secured, about a vertical axis, to said inner ends of said left auxiliary tool bar section and said left auxiliary truss member;

a third hydraulic cylinder pivotally interconnected to said right truss member and said right auxiliary truss member;

and a fourth hydraulic cylinder pivotally interconnected to said left truss member and said left auxiliary truss member.

3. The full truss tool bar of claim 2 wherein said right and left auxilliary truss members have lengths shorter than the lengths of said right and left auxilliary tool bar wing sections.

* * * * *